(12) United States Patent
Ferencik

(10) Patent No.: US 7,416,480 B2
(45) Date of Patent: Aug. 26, 2008

(54) FLAVOR INFUSER

(76) Inventor: Ed Ferencik, 15505 Donneybrook Ct., Reno, NV (US) 89511

( * ) Notice: Subject to any disclaimer, the term of this patent is extended or adjusted under 35 U.S.C. 154(b) by 92 days.

(21) Appl. No.: 11/464,211

(22) Filed: Aug. 14, 2006

(65) Prior Publication Data

US 2008/0035772 A1     Feb. 14, 2008

(51) Int. Cl.
*A22C 9/00* (2006.01)
(52) U.S. Cl. ...................................... 452/141
(58) Field of Classification Search ............ 452/102, 452/103, 141, 146, 147; 30/123; 241/168, 241/169.1, 169.2, 101.4, 101.01
See application file for complete search history.

(56) References Cited

U.S. PATENT DOCUMENTS

| | | | | |
|---|---|---|---|---|
| 207,107 A * | 8/1878 | Davies | ...................... | 452/146 |
| 1,047,346 A * | 12/1912 | Walker | ...................... | 452/141 |
| 1,220,970 A * | 3/1917 | Frohmann | ................... | 452/30 |
| 3,661,072 A * | 5/1972 | Allinquant et al. | ............ | 99/532 |
| D229,274 S * | 11/1973 | Allinquant | ................... | D7/682 |
| 4,169,300 A * | 10/1979 | McCullough | ............... | 452/141 |
| 4,199,841 A * | 4/1980 | Jaccard | ...................... | 452/146 |
| 4,257,144 A * | 3/1981 | Takegoshi et al. | ........... | 452/146 |
| 4,463,476 A * | 8/1984 | Jaccard | ...................... | 452/146 |
| 4,870,717 A * | 10/1989 | Hirano | ...................... | 452/147 |
| 4,953,456 A * | 9/1990 | Prosenbauder | ............... | 99/533 |
| 5,085,614 A * | 2/1992 | Bourret | ...................... | 452/141 |
| D362,589 S * | 9/1995 | Cohen et al. | ................. | D7/393 |
| 6,135,873 A * | 10/2000 | Jaccard | ...................... | 452/141 |
| 6,585,179 B2 * | 7/2003 | Weibel et al. | ................ | 241/169 |
| D481,268 S * | 10/2003 | Hibbert et al. | ............... | D7/682 |
| D495,923 S * | 9/2004 | Zemel | ......................... | D7/393 |
| 6,948,670 B2 * | 9/2005 | Kujawski et al. | ............ | 241/169 |
| 7,182,685 B2 * | 2/2007 | Gorowski | ................... | 452/141 |
| 2005/0239388 A1* | 10/2005 | Gorowski | ................... | 452/141 |

* cited by examiner

*Primary Examiner*—Thomas Price
(74) *Attorney, Agent, or Firm*—Todd L. Juneau

(57) ABSTRACT

A hand-held food processor having a weighted cylindrical universal handle with a circular triangle shaped base which can accommodate various detachable optional base pieces. The base pieces contemplated include a piercing tenderizer assembly, a coarse plate, as well as a smooth plate.

16 Claims, 17 Drawing Sheets

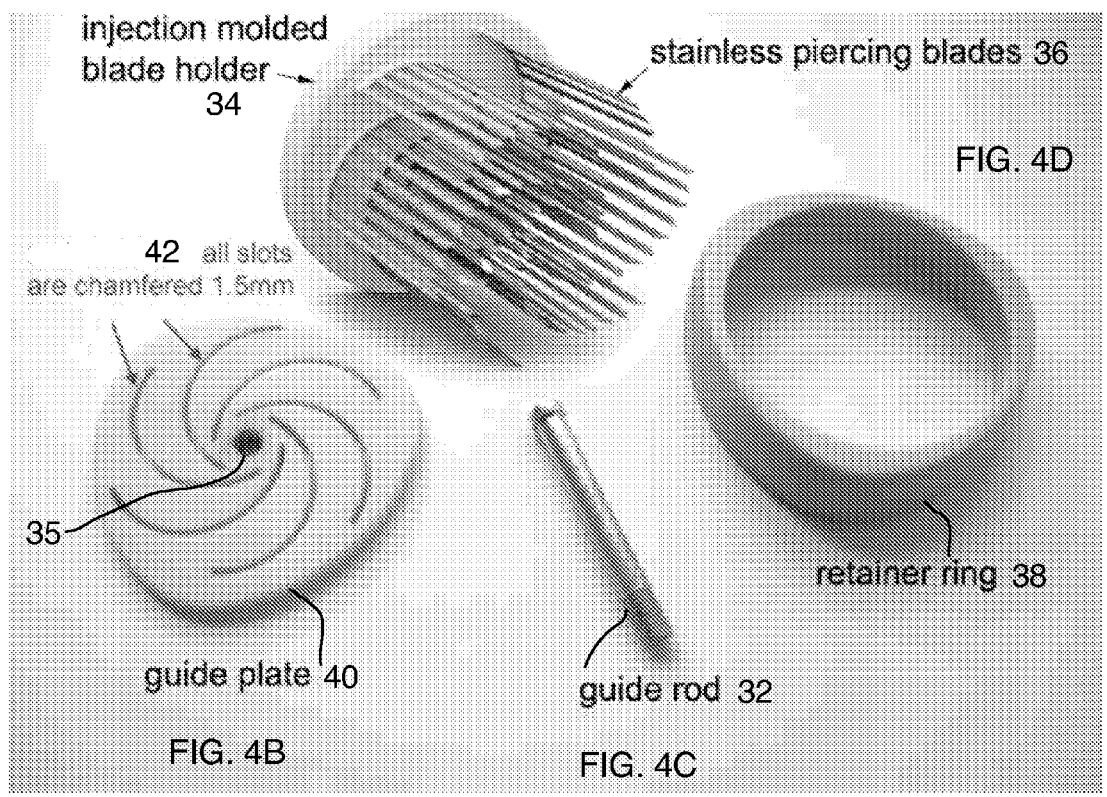

FIG. 7B
FIG. 7A
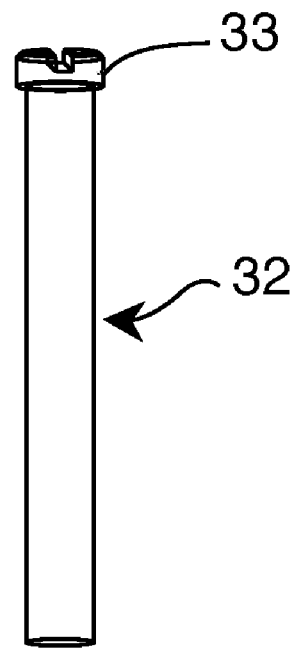
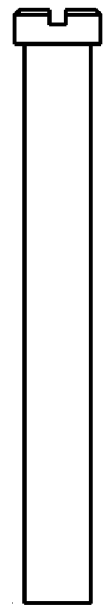
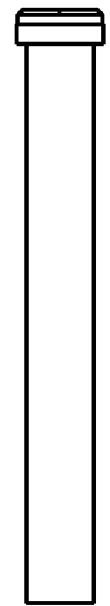
FIG. 7C
FIG. 7D

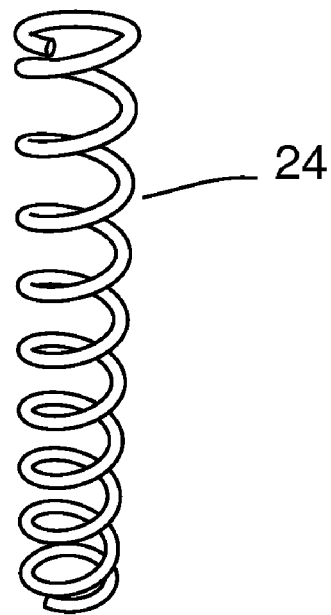
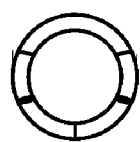
FIG. 8A
FIG. 8B
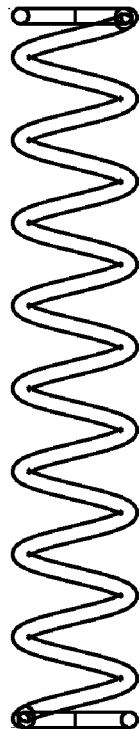
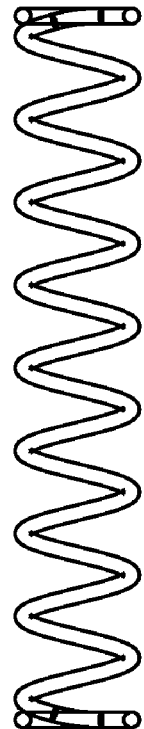
FIG. 8C
FIG. 8D

FIG. 9A
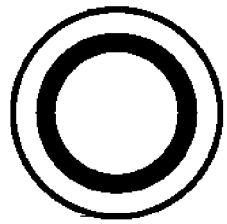
FIG. 9B
26
 
FIG. 9C   FIG. 9D Fig. 10A
Fig. 10B
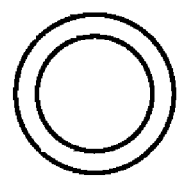
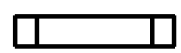  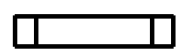
Fig. 10C          Fig. 10D

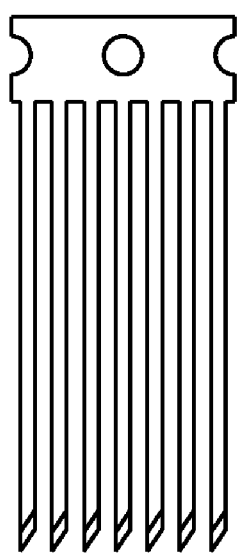
FIG. 12A
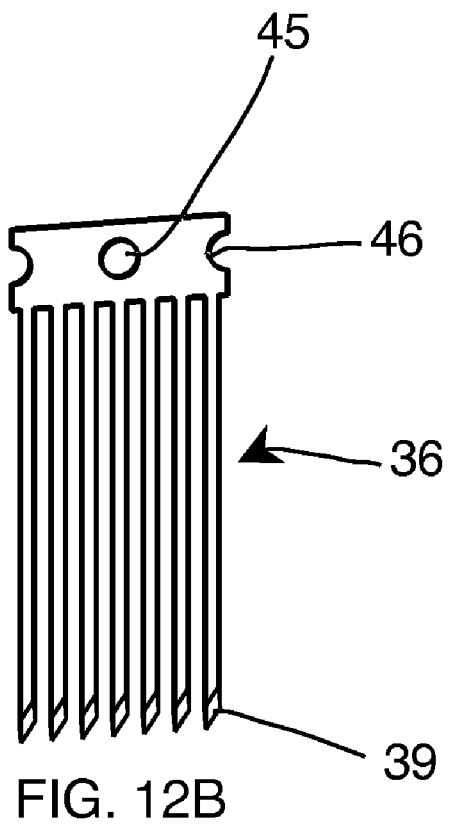
FIG. 12B
FIG. 12C
FIG. 12D

FLAVOR INFUSER

BACKGROUND

1. Field of the Invention

The invention relates to a hand-held kitchen tool, and more particularly to a mechanical food processor for tenderizing or processing meat, vegetables and the like.

2. Description of the Prior Art

There are many tenderizers known in the art, including those which operate like a specialized hammer and those which have blades for piercing the food. An early example of this is by Andre Jaccard, U.S. Pat. No. 4,119,841, which discloses a hand operated meat tenderizer having multiple piercing elements held by a handle and a stripping plate to retract the elements. Another example of a hand held food processor having blades is U.S. Pat. No. 6,948,670 to Kujawski et al. which is directed toward making the disassembly and cleaning of a multi-bladed piercing tool easier.

SUMMARY

The present inventive subject matter comprises a hand-held food processor having a weighted cylindrical universal handle with a circular triangle shaped base which can accommodate various detachable optional base pieces. The base pieces contemplated include a piercing tenderizer assembly, a coarse plate, as well as a smooth plate. The universal handle has a center cavity with a spring or other resistive mechanism such that when the piercing tenderizer assembly is threaded onto the handle and the unit is brought to strike the food, the piercing blades extend beyond the blade guide plate and the blades pierce the food. A guide rod holds the guide plate to the handle and the guide rod fits into the center cavity of the handle. During impact, the guide rod-guide plate structure slides toward the handle and the guide rod passes into the cavity and makes contact with the spring element by way of a spring retainer. On release, the spring element drives the guide rod-guide plate away from the handle as the piercing blades retract back along the guide plate. The piercing blades have angled cutting tips such that the food is actually cut or sliced by the blade. This feature provides one advantage over round piercing blades whereby the cutting blade allows the marinade to infuse into the food much more efficiently than with food which has merely been punctured. The piercing blades are contemplated to be in a variety of blade configurations or patterns within the cam shape of the blade holder, such patterns include a spiral pattern or row-upon-row pattern.

BRIEF DESCRIPTION OF THE DRAWINGS

FIG. 1 illustrates a blade pattern which comprises multiple parallel rows of blades.

FIG. 4 shows a perspective view of a piercing assembly comprising blades and blade holder (4A), guide plate (4B), guide rod (4C), and mounting ring (4D) (also called a retainer ring, herein).

FIG. 6B also includes a non-limiting example of the dimensions of the universal handle (~123 mm H, ~74.5 mm dia. at bottom, ~14.7 mm cavity dia.).

FIG. 7 shows a top view (7A), and side views (7B, 7C, 7D) of the guide rod and includes a non-limiting example of dimensions of the guide rod (~9 mm dia at top, ~7 mm dia. bottom, ~62 mm H).

FIG. 8 shows a top view (8A), a perspective view (8B), a front side view (8C), and a back side view (8D) of the return spring. FIG. 8 also includes non-limiting examples of the dimensions of the return spring (~14.5 mm outer dia., ~84 mm H).

FIG. 9 shows a top view (9A), perspective view (9B), front side view (9C), and back side view (9D) of the spring cover, as well as non-limiting examples of dimensions of the spring cover (~14.5 mm outer dia., ~1.5 mm H).

FIG. 10 shows a top view (10A), perspective view (10B), front side view (10C), and back side view (10D) of the spring retainer, as well as non-limiting examples of dimensions of the spring retainer (~14.7 mm outer dia, ~10.7 mm inner dia., ~2.8 mm H).

FIG. 12 shows a top view (12A), perspective view (12B), front side view (12C), and side view (12D) of the blade insert, as well as non-limiting examples of dimensions of the blade insert (~23 mm W, ~0.8 mm D, ~56 mm H total with blades ~47 mm H and bridge ~9 mm H).

DETAILED DESCRIPTION OF THE PREFERRED EMBODIMENTS

Figure 1:
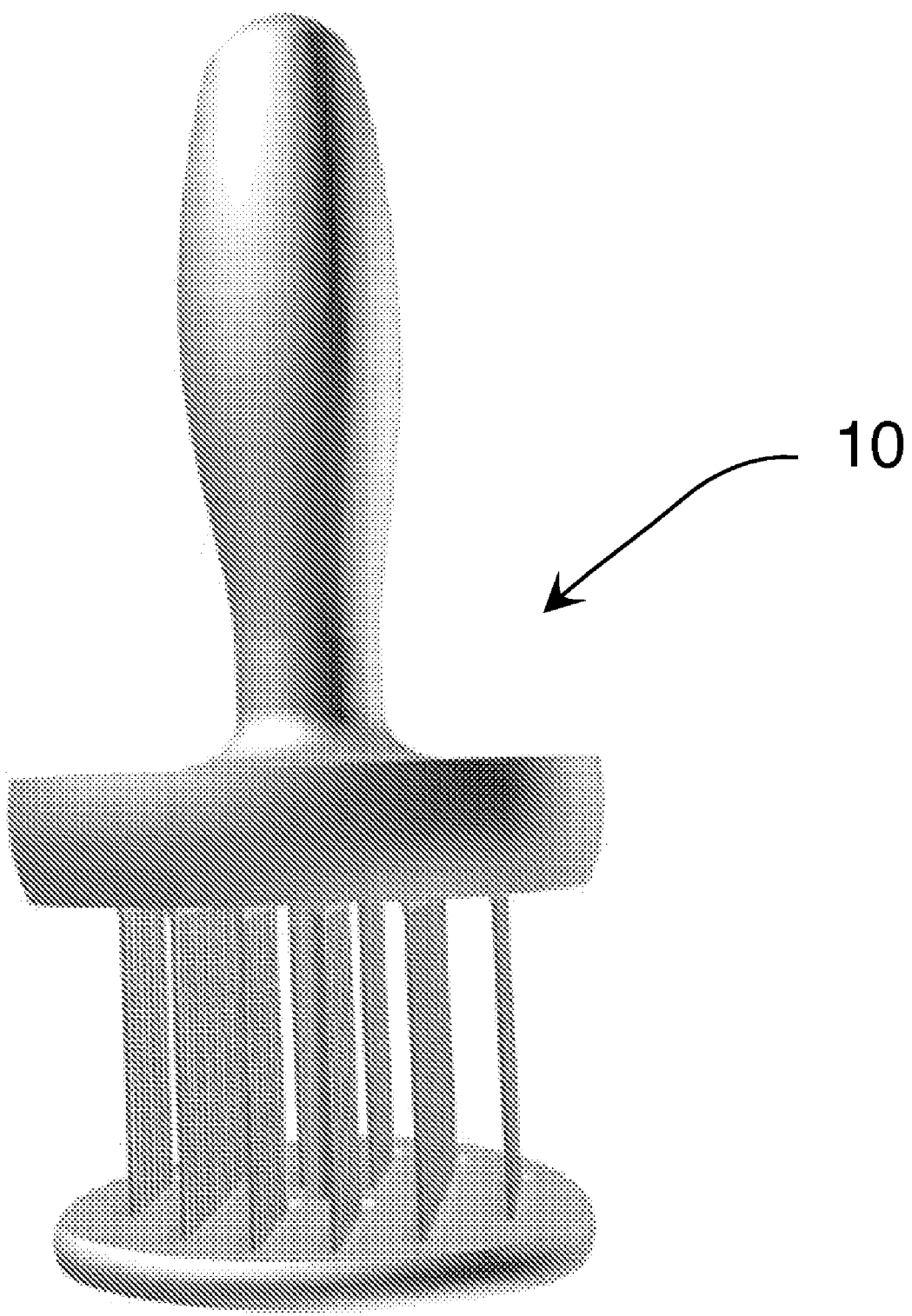
FIG. 1 shows a front side perspective view of a preferred embodiment of a food processor in accordance with the invention.

The food processor as described herein comprises many features of interest. These features may be novel either alone or in combination with other features described herein. These are provided below, however they are not necessarily presented in order of importance or criticality. Nor is it a requirement for every single embodiment to have every feature but variations as claimed herein and their equivalents are contemplated as within the scope of the invention.

One feature is an ergonomic universal handle. The universal handle is comprised of a top cylindrical portion, shaped as a prolate ellipsoid, with the shape being weighted at the top end. In a preferred embodiment, the handle weighs from about 0.75 lbs. to about 1.5 lbs., or about 340 grams to about 681 grams, when manufactured from a metal alloy and 0.25 lbs. to 0.75 lbs. (113 g-340 g) when manufactured from a plastic or synthetic material. In this embodiment the tool would derive its weightiness from the metal mounting ring weighing from about 0.50 lbs. to about 1. lbs, or about 227 g to about 454 g. It is expected that the handle is composed of a zinc core plated with nickel, copper, a stainless steel finish, or a combination of 2 or 3 of the above. Also contemplated within the scope of the invention is where bronze, copper, metal alloys, ceramics, synthetic materials, or other weighty and durable materials or combinations of materials are used.

At the other end of the cylindrical portion is a disc shaped base. In a preferred embodiment, the disc shaped base has a curved triangle shape. The ergonomics of this shape is that when the cylinder portion, the handle grip, is grasped by the hand, the curved triangle shape of the base aligns with the $5^{th}$ metacarpal portion of the hand (the part that hits the table during a pounding motion aka the abductor digiti minimi muscle). During use, this allows for a one-handed operation but also maximizes impact efficiency and impact evenness by aligning the food processor along the natural downward strike path of the human arm and hand.

Another important feature concerns the blades, blade spacing/orientation, and blade guide. These contribute to provide an efficient piercing of the food to be processed. The blades are cutting blades; that is, blades have a sharpened, tapered cutting edge at each tip. Thus provides a cutting of the food rather than a mere puncture and allows for a more efficient marination by breaking down muscle fiber and connective tissue in a way that simple piercing does not. In a preferred embodiment, the blades are made from surgical stainless steel. The blade orientation also assists tenderizing efficiency. In one embodiment, the use of multiple parallel rows of blades is effective, particularly when used against the grain of the meat or vegetable to reduce the toughening effect of the fibers and connecting tissue. In another preferred embodiment, the use of a spiral blade orientation is effective for attacking the fibers and tissue from many angles at once, thus reducing the need to continuously rotate the food to be processed, saving preparation time. The use of a blade guide keeps the blades, no matter which design is employed, from becoming misaligned during use. Additionally, the spacing of the rows of blades reduces the jamming of the unit by avoiding a pinching effect from row to row. In a linear blade orientation the spacing is from about 3 mm to about 7 mm, depending on the number of rows and blades used. In a preferred embodiment, the spacing is about 4 to about 6 mm between rows.

Another feature is the overall size of the unit. In a preferred embodiment, the height of the entire processor is from about 120 mm to about 200 mm, more preferably form about 130 to about 180 mm. The handle is preferably from about 70 mm to about 140 mm. The handle grip width is from about 20 mm to about 40 mm in diameter. The width of the disc shaped base and plates range from about 50 mm to about 90 mm. By having a compact handle and striking (tenderizing) mechanism, the invention doesn't use valuable kitchen space. Further, during use, the vertical, cylindrical design enables reducing the lateral instability attributed to more rectilinear multi-bladed tenderizers or those which are more cumbersome. Increasing stability can not only allow for increased efficiency but also reduced operating mistakes. This is an especially important feature when considering that users will differ in their strength and thus the force and control when tenderizing.

Another feature includes the spring mechanism. During operation, the spring mechanism is sealed away from the food and thus avoids food-based interference with the spring. The spring mechanism is comprised of a spring disposed within a cylindrical cavity inside the handle, and a central guide rod which connects the blade guard to the blade holder (casting). When extended, the spring pushes the rod out from the cavity and, when collapsed (or compacted), the rod compresses the spring within the cavity and the rod slides into and is inserted within the cavity. It is also considered as within the scope of the invention to utilize other types of resistive mechanisms, such as fluid or gas hydraulics which would have (not shown) sealed within the handle, an outer hydraulic cylindrical sleeve for containing a fluid or gas, sealed at one end, and the other end having an aperture adapted to receive the guide rod which functions as a piston axially located within the sleeve.

Yet another feature concerns the piercing tenderizer assembly and its manufacture. In a preferred embodiment, the mounting ring, holder, and guide are made from plastic, ceramic, composite or synthetic materials. In one preferred embodiment, the assembly is made from injection molded plastic.

Referring now to the figures, FIG. 1 shows a front side perspective view of a preferred embodiment of a food processor (10) in accordance with the invention. FIG. 1 illustrates a blade pattern which comprises multiple parallel rows of blades. FIG. 1 shows an embodiment of an ergonomic handle comprised of a top cylindrical portion, in the shape of a prolate, or cigar-shaped, ellipsoid, with the shape being weighted at the top end. At the other end of the cylindrical portion is a disc shaped base. In a preferred embodiment, the disc shaped base has a curved triangle shape. FIG. 1 also shows six rows of blades fit within the circular perimeter. A first row having seven blades, a second row having two sets of seven blades (14 total), a third 'split row' and a fourth 'split row', each of the third and fourth row having two side-by-side lines of seven blades split by a gap to give space for the guide rod (14 in row 3 and 14 in row 4). A fifth row having two sets of seven, or 14, blades, and a sixth row having 7 blades. In this embodiment, there totals 70 blades. Each row is positioned such it creates a lateral space between rows 1 and 2, 2 and 3, 3 and 4, 4 and 5, and 5 and 6, thus reducing any jamming of the processor during use.

Figure 2:
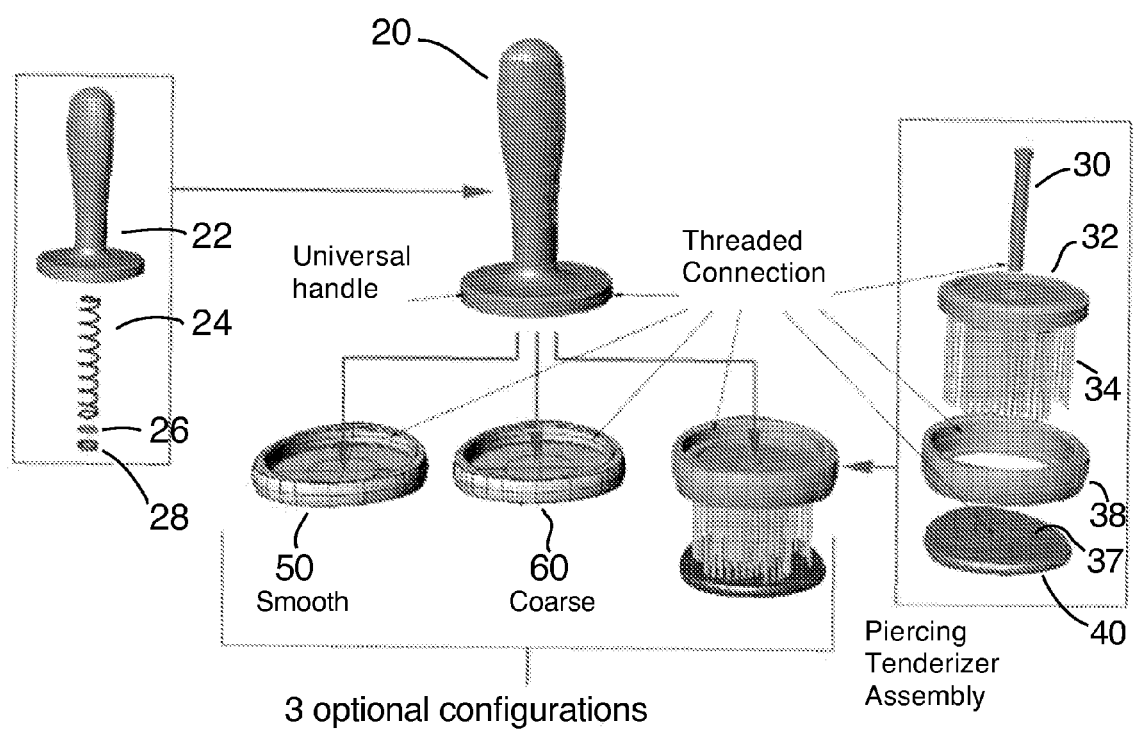
FIG. 2 shows a disassembled perspective view of an embodiment of the food processor and illustrates three optional base configurations for attaching to the universal handle and, for the piercing tenderizer assembly also illustrates a blade pattern which comprises multiple rows of blades in a spiral design.

FIG. 2 shows a disassembled perspective view of an embodiment of the food processor and illustrates three optional base configurations for attaching to the handle (20), namely a piercing tenderize assembly (30), a smooth plate (50), and a coarse plate (60). These plates are threaded to fit onto universal handle (20) but can be interchanged depending on the use required by the user. For example, the smooth plate (50) would be appropriate when a user needs to tenderize by flat pounding. Conversely, the coarse plate (60) is designed to provide pounding plus additional surface features, e.g. knobs, to assist in breaking the food fibers. The piercing tenderizer assembly (30) is designed to provide multiple cutting blades during a tenderizing step and also threads onto the universal handle (20) similar to the other plates.

FIG. 2 shows universal handle (20) which comprises handle (22), spring (24), spring cover (26), and spring retainer (28), of which fit into the handle cavity (not shown). FIG. 2 also shows an illustrative piercing tenderizer assembly (30) comprising guide rod (32), blade casting (34), a blade pattern which comprises multiple rows of blades in a spiral design (37), mounting ring (38), and blade guard (40).

Figures 3A, 3B:
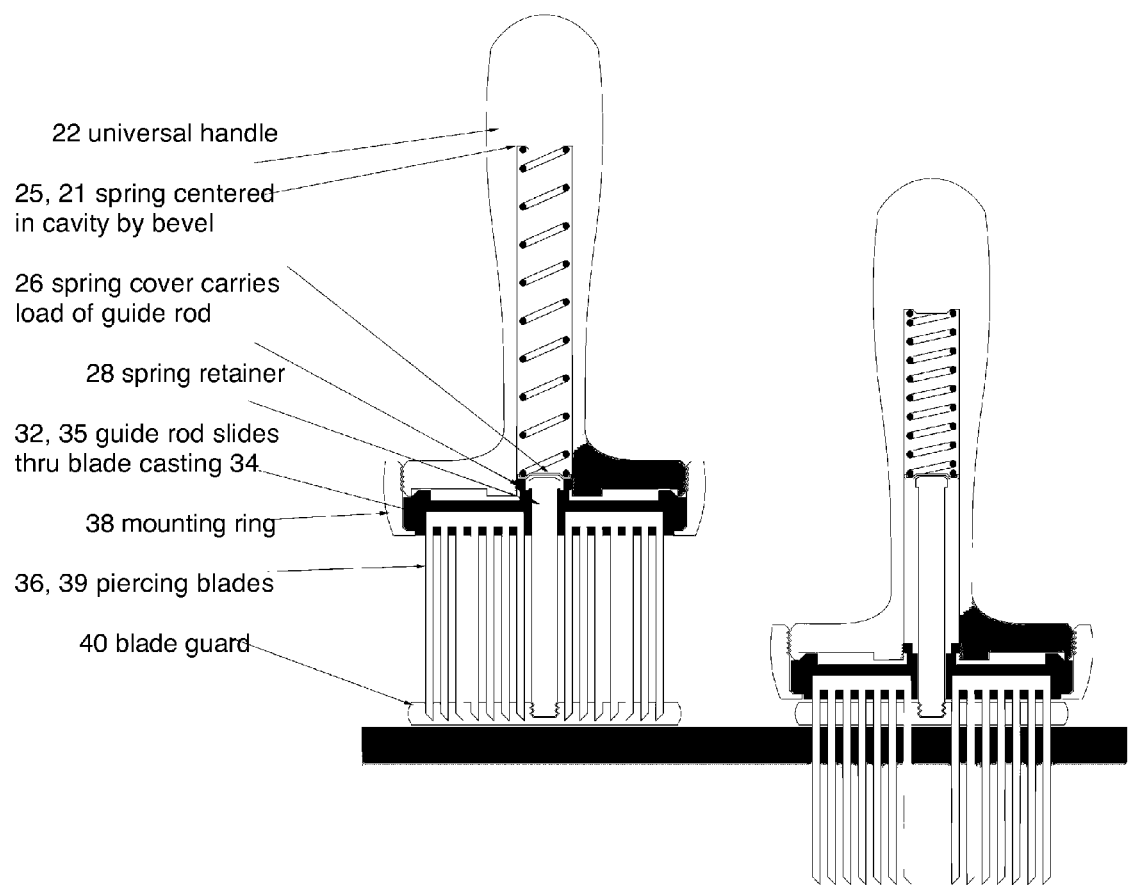
FIG. 3 shows a cross-sectional view of a food processor in accordance with the invention and illustrates the food processor before (3A) and after (3B) piercing, i.e. before is in a retracted (blades up) position (3A) and after piercing is in a blades extended position (3B).

FIG. 3 shows a cross-sectional view of a food processor (10) in accordance with the invention and illustrates the food processor before piercing in retracted (blades up) position and after piercing in blades extended position. FIG. 3 shows die cast handle (22), having spring cavity (21), bevel (25), spring cover (26), and spring retainer (28) which threads into the spring cavity trapping the spring and the cover. FIG. 3 also shows guide rod (32) which cooperatively engages the spring cover at its top end, slides through a guide rod channel (35) in the blade casting (34), and at the bottom end has a threaded portion for threading onto the blade guard (40).

FIG. 3 also shows the food processor (10) after blade extension and illustrates the compression of the spring when the guide rod pushes on the spring cover and is thereby disposed within spring cavity (21). FIG. 3 also shows how mounting ring (38) descends to the blade guard (40) to a full extension rest position wherein the mounting ring (38) is adjacent to the blade guard (40).

FIG. 3 also shows the tapered edge (39) of a blade, illustrating how it is shaped to accomplish the cutting action.

FIG. 4 shows perspective views of a blade holder (casting) and piercing assembly. FIG. 4 shows blade casting (34) which incorporates the blades into a single unit. Mounting ring (38) illustrates the circular triangle shape and which is used as a shape in multiple places on the food processor (10), from the base of the handle (not shown), to the mounting ring (38), and the blade guard (40). Note that the circular triangle is not used on the blade casting (34) in the embodiment where the plates thread onto each other since the blade casting must remain circular for proper threading. However, other mechanisms of attaching the various plates are contemplated as within the scope of the claimed invention, such as pressure clips, bead and trough snap-ons, screws, gaskets and the like. FIG. 4 also shows guide rod channel (35) of the blade casting (34) through which the guide rod (32) passes as a piston. FIG. 4 also shows tapered blade (39). In a preferred embodiment, blades (36) are surgical stainless steel and blade holder (34) is injection molded to create an integrated, unitary piece, blade casting (34). In this embodiment, there are seven curved rows of blades creating a spiral design, each row having 10 blades, or a total of 70 blades overall. Guide plate (40) is shown here with slot (42) having a chamfered, or beveled, edge which can be used to further assist guiding the blades during strenuous operation. Guide rod (32) is shown having a threaded end and an upper end, which can, in certain embodiments be fitted with a knob for better engagement with the spring cover (not shown). FIG. 4 also shows mounting ring (38) having a outer perimeter shape of a circular triangle and an inner perimeter shape of a circle and having an overall sleeve height capable of connecting the universal handle, e.g. as a collar attachment, for attaching to the particular plate selected.

Figure 5:
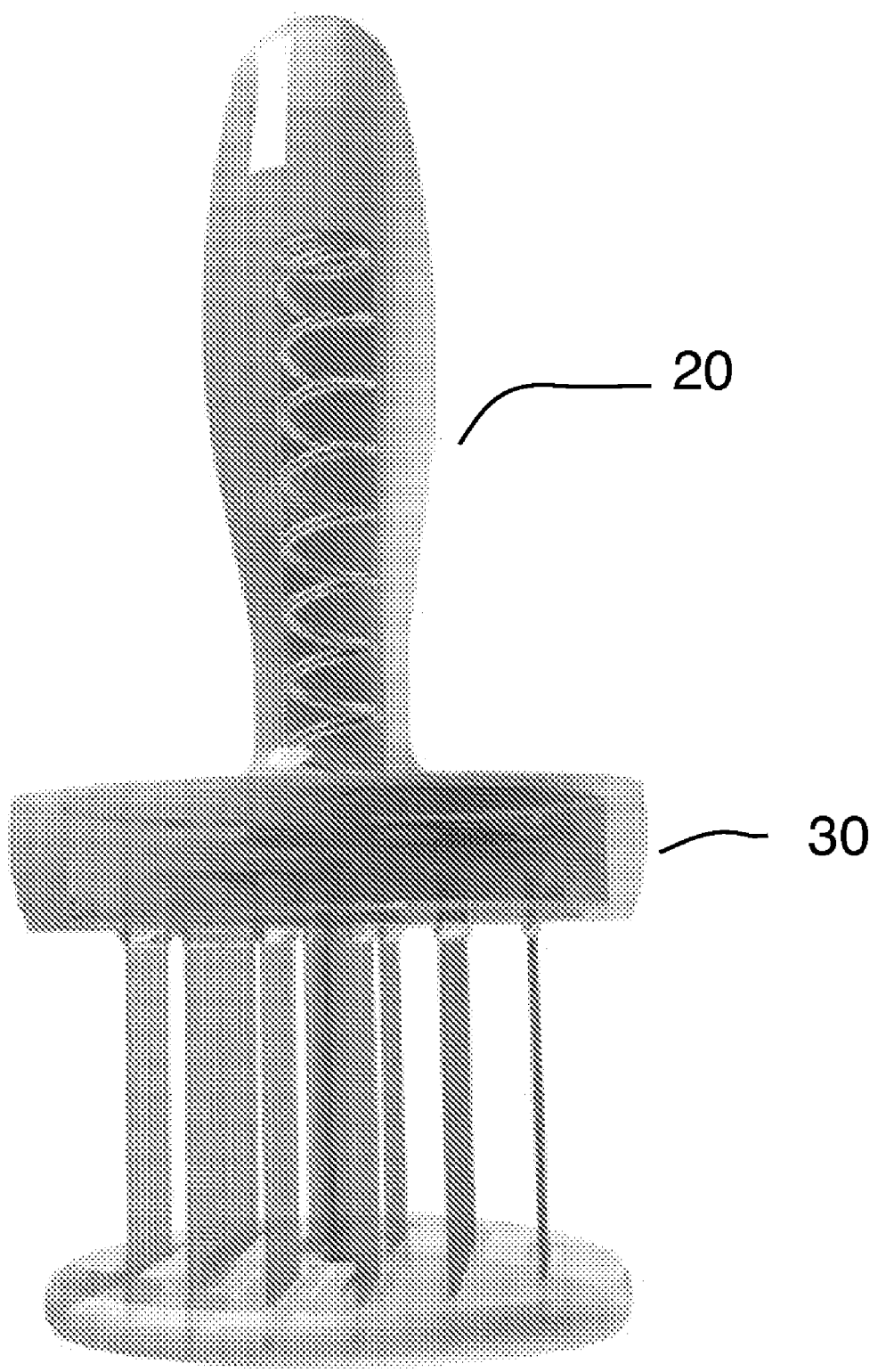
FIG. 5 shows a front side perspective view which includes a transparent view of the universal handle having the piercing tenderizer assembly attached.

FIG. 5 illustrates, by way of front side perspective view which includes a transparent view, the universal handle (20) along with its inner workings, and having the piercing tenderizer assembly attached (30).

Figure 6A:
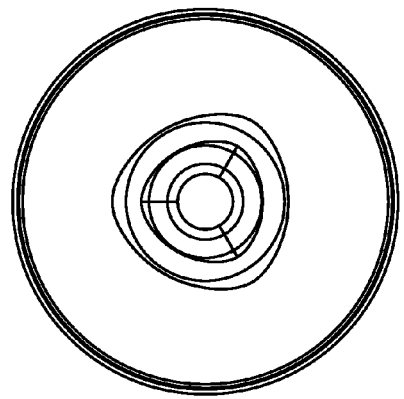
FIG. 6A shows a top view of the universal handle.
Figure 6B:
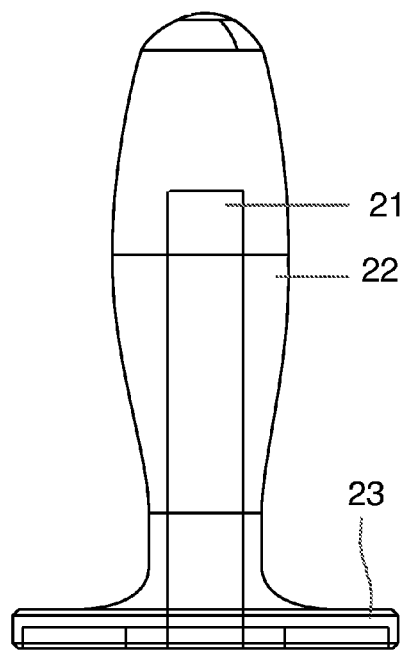
FIG. 6B, 6C show a side cross-sectional view of the universal handle and includes a view of the spring cavity therein.
Figure 6C:
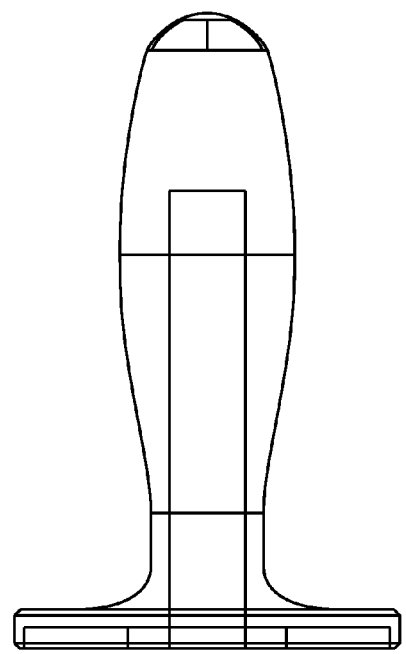
Figure 11A:
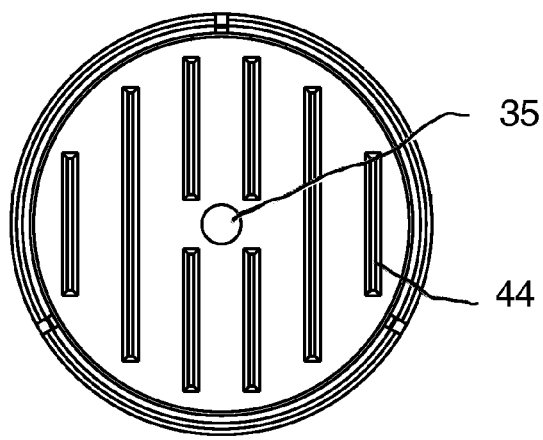
FIG. 11 shows a top view (11A), perspective view (11B), front side view (11C), and back side view (11D) of the blade casting, as well as non-limiting examples of dimensions of the blade casting (~74 mm Dia, ~14 mm H, distance between rows of blade thru-holes ~10-11 mm).
Figure 11B:
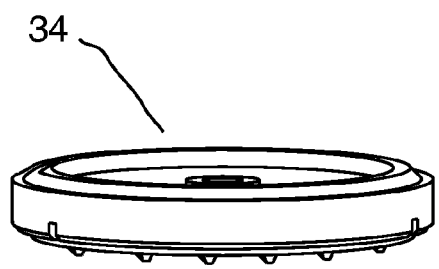
Figure 11C:
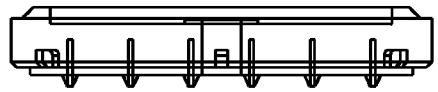
Figure 11D:
Figure 13A:
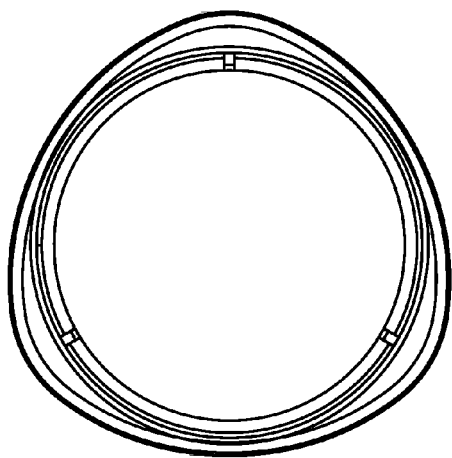
FIG. 13 shows a top view (13A), perspective view (13B), front side view (13C), and back side view (13D) of the mounting ring, as well as non-limiting examples of dimensions of the mounting ring (~86 mm Dia, ~17-18 mm H).
Figure 13B:
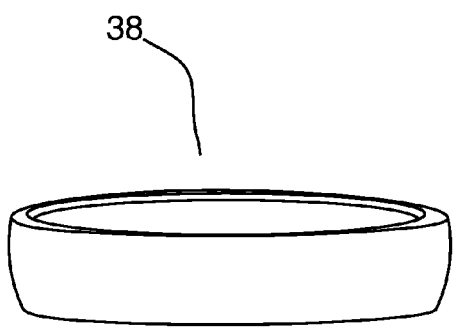
Figure 13C:
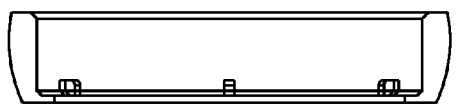
Figure 13D:
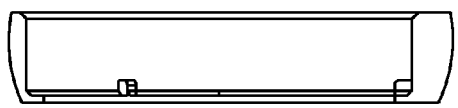
Figure 14A:
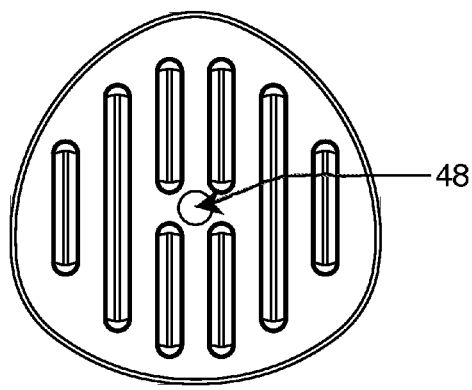
FIG. 14 shows a top view (14A), perspective view (14B), front side view (14C), and back side view (14D) of the blade guide, as well as non-limiting examples of dimensions of the blade guide (~77 mm Dia, ~6 mm H).
Figure 14B:
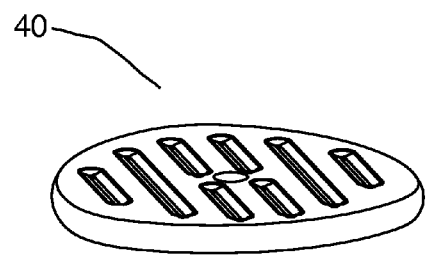
Figure 14C:
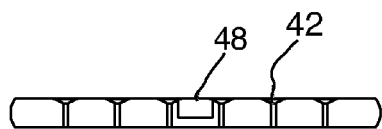
Figure 14D:
Figure 15A:
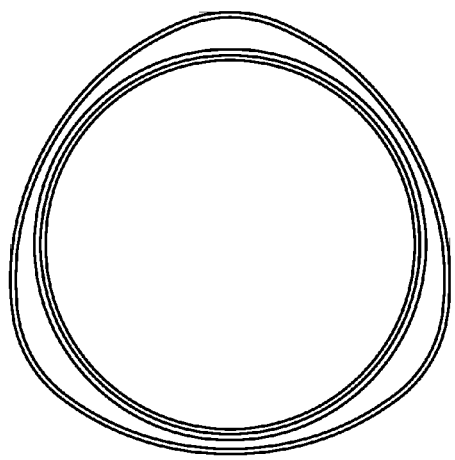
FIG. 15 shows a bottom view (15A), perspective view (15B), front side view (15C), and back side view (15D) of the smooth plate, as well as non-limiting examples of dimensions of the smooth plate (~87 mm Dia, ~11 mm H).
Figure 15B:
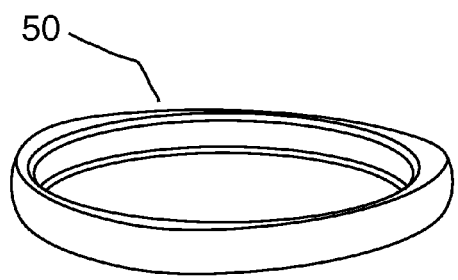
Figure 15C:
Figure 15D:
Figure 16A:
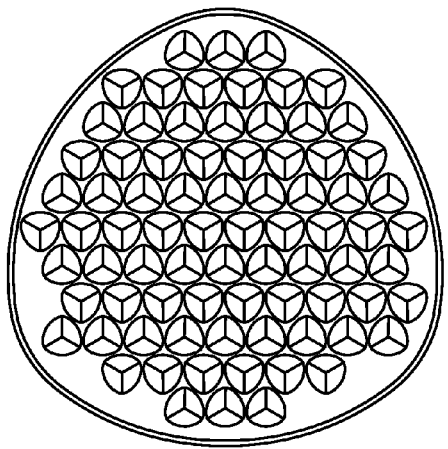
FIG. 16 shows a bottom view (16A), perspective view (16B), front side view (16C), and back side view (16D) of the coarse plate, as well as non-limiting examples of dimensions of the coarse plate (~87 mm Dia, ~14 mm H).
Figure 16B:
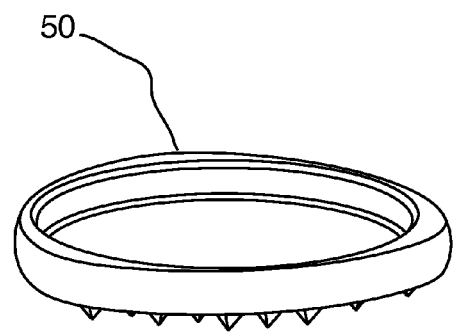
Figure 16C:
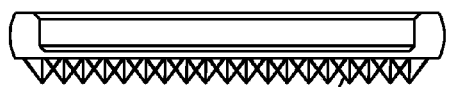
Figure 16D:
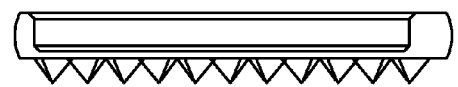
Figure 17A:
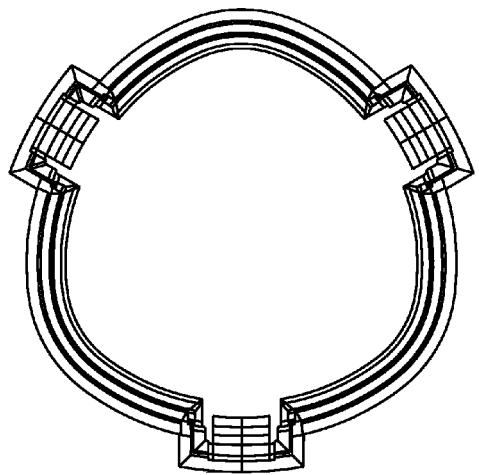
FIG. 17 shows a top view (17A), perspective view (17B), front side view (17C), and back side view (17D) of the stand, as well as non-limiting examples of dimensions of the stand (~98 mm Dia, ~96 mm H).
Figure 17B:
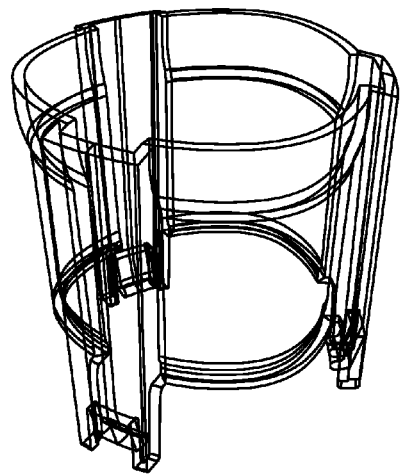
Figure 17C:
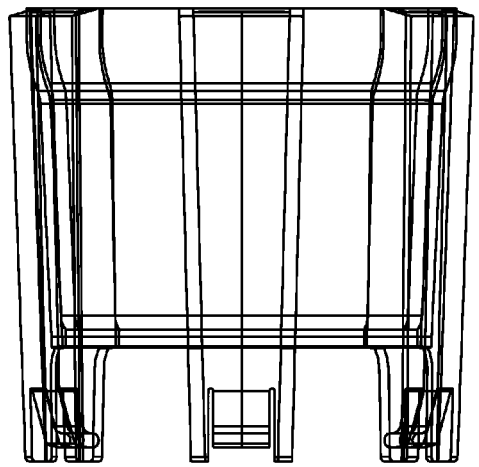
Figure 17D:
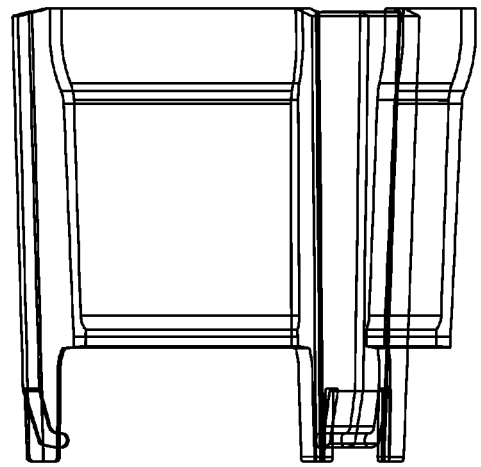

FIG. 6a shows a top view of the universal handle and illustrates the handle base and how it accommodates the users hand for effective processing. FIG. 6b shows a side cross-sectional view of the universal handle and includes a view of the spring cavity therein. FIG. 6 also includes a non-limiting example of the dimensions of the universal handle.

FIG. 7 shows a side view of the guide rod and includes a non-limiting example of dimensions of the guide rod. The spring attachment head (33) is positioned at one end, and this end is enclosed within the universal handle's spring cavity (21)(not shown). The distal end of the guide rod (32) cooperates in operation through the guide rod channel (35) of the blade casting (34)(not shown) and seats into the guide rod terminus (48)(FIG. 14).

FIG. 8 shows a top view, a perspective view, a front side view, and a back side view of the return spring. FIG. 8 also includes non-limiting examples of the dimensions of the return spring. In operation the spring (24) is attached at one end to the universal handle (20) at the bevel (25) within the spring cavity (21). The other end, or distal end, of the spring (24) engaged with the spring cover (26), which is adjacent the spring retainer (28) and which further is mated with the guide rod (32).

FIG. 9 shows a top view, perspective view, front side view, and back side view of the spring cover, as well as non-limiting examples of dimensions of the spring cover. FIG. 10 shows a top view, perspective view, front side view, and back side view of the spring retainer, as well as non-limiting examples of dimensions of the spring retainer. The operation of these elements may vary as might be known to a person of ordinary skill in these arts, and the specific example provided herein is by way of explanation is not intended to be limiting unless otherwise so stated on the record.

FIG. 11 shows a top view, perspective view, front side view, and back side view of the blade casting, as well as non-limiting examples of dimensions of the blade casting. FIG. 11 illustrates the guide rod channel (35) which operates as the aperture through the guide rod travels. Blade recess (44) securely hold the blades (36) in place, but are also designed for removal and replacement of the blade arrays. Blade replacement cartridges are considered within the scope of the present invention. In operation, the blade casting (34), also called the blade holder herein, is attached to the universal handle (20) by way of collar attachment with the mounting ring (38). Non-limiting exemplary attachment mechanisms include screw-type, clip-on, slotted type, snap-on, and others, as is within the level of ordinary skill in this art.

FIG. 12 shows a top view, perspective view, front side view, and side view of the blade insert, as well as non-limiting examples of dimensions of the blade insert. These blade inserts (36) may in one embodiment be attached into blade casting (34) and specifically in the blade recesses (44) using blade seating aperture (45) in combination with blade seating notch (46). Other attachment means, for instance for the spiral blade inserts, are contemplated as within the scope of the invention and are known to persons of ordinary skill in this art. Tapered edge (39) is illustrated as well. Blade cartridges for use in the hand-operated food processor are contemplated as within the scope of the present invention, and which comprise blade seating means operably attached to a plurality of parallel blades, said blade cartridge having between about 5 and about 15 blades, and one or more, or even all, of said blades having a tapered cutting edge.

FIG. 13 shows a top view, perspective view, front side view, and back side view of the mounting ring, as well as non-limiting examples of dimensions of the mounting ring (38). The mounting ring (38) is used to secure the various attachments to the universal handle (20). In the case of the piercing tenderizer assembly (30), it secures the blade casting (34), also called the blade holder herein, to the universal handle (20) by way of collar attachment. As discussed herein, non-limiting exemplary attachment mechanisms include screw-type, clip-on, slotted type, snap-on, and others, as is within the level of ordinary skill in this art.

FIG. 14 shows a top view, perspective view, front side view, and back side view of the blade guide, as well as non-limiting examples of dimensions of the blade guide. Guide rod terminus (48) as well as chamfered slot (42) is shown in this exemplary non-limiting embodiment.

FIGS. 15 and 16 shows a top view, perspective view, front side view, and back side view of the smooth plate (50) and the coarse plate (60), respectively, as well as non-limiting examples of dimensions of them both. Smooth plate impact surface (52) and coarse plate impact surface (62) are shown and illustrate how the food processor may be used to mechanically break down and tenderize the food by pounding.

FIG. 17 shows a top view, perspective view, front side view, and back side view of the optional stand (80), as well as non-limiting examples of dimensions of the stand (80). The stand (80) comprises a cylindrical unit (82) having raised supports (84) which allow for raised storage of the food processor while it has the piercing tenderizer assembly (30) still attached. Footings (86) raise the cylinder (82) above the storage surface, e.g. countertop.

EXAMPLE 1

|  | part name | weight (g) | material |
| --- | --- | --- | --- |
| universal handle | universal handle | 560 | Zinc |
|  | spring | 9 | 304SS |
|  | spring cover | 2 | 304SS |
|  | spring retainer | 2 | 304SS |
| piercing tenderizer | guide rod | 20 | 304SS |
|  | blade molding | 41 | PP |
|  | mounting ring | 145 | Zinc |
|  | piercing blades | 30 | 304SS |
|  | blade guide | 168 | Zinc |
| end plates | coarse plate | 70 | Aluminum |
|  | flat plate | 65 | Aluminum |
| cover/stand | snap on cover/stand | — | ABS |

It will be clear to a person of ordinary skill in the art that the above embodiments may be altered or that insubstantial changes may be made without departing from the scope of the invention. Accordingly, the scope of the invention is determined by the scope of the following claims and their equitable Equivalents.

What is claimed is:

1. A hand operated food processor comprising a universal handle and a detachable tenderizing plate, said universal handle having a cylindrical upper portion adapted for being grasped with a human hand and a disc-shaped base, said disc-shaped base having means for attaching the tenderizing plate, wherein the means for attaching the tenderizing plate further comprises cooperative threading on the disc-shaped base and on a mounting ring for the tenderizing plate, wherein the mounting ring threadably engages the universal handle to attach the tenderizing plate, and wherein the tenderizing plate is selected from the group consisting of a smooth plate, a coarse plate, and a piercing tenderizer plate.

2. The food processor of claim 1, wherein the mounting ring weighs from about 227 grams to about 454 grams.

3. The food processor of claim 1, wherein the universal handle comprises a zinc core plated with a metal selected from the group consisting of nickel, copper, and stainless steel.

4. The food processor of claim 1, wherein the universal handle is weighs from abaout 340 grams to about 681 grams.

5. The food processor of claim 1, wherein the universal handle comprises a plastic material or synthetic material.

6. The food processor of claim 1, wherein the universal handle is weighs from about 113 grams to about 340 grams.

7. The food processor of claim 1, wherein the piercing tenderizing plate comprises a blade holder having a plurality of tapered blades and a mounting ring for attachably mounting the blade holder to the universal handle.

8. The food processor of claim 1, wherein the universal handle having a cylindrical upper portion further comprises a spring cavity and a spring operably disposed therein to provide a resistive force, wherein the detachable tenderizing plate is a piercing tenderizing plate which comprises a blade holder having a plurality of tapered blades, a guide plate for aligning the plurality of tapered blades, a guide rod having an upper end in communication with the spring and said guide rod having a lower end attached to the guide plate, and a mounting ring for attachably mounting the piercing tenderizing plate to the universal handle.

9. The food processor of claim 1, wherein the universal handle further comprises fluid or gas hydraulics sealed within the handle and disposed therein to provide a resistive force, wherein the detachable tenderizing plate is a piercing tenderizing plate which comprises a blade holder having a plurality of tapered blades, a guide plate for aligning the plurality of tapered blades, a guide rod having an upper end in communication with the hydraulics, said guide rod having a lower end attached to the guide plate, and a mounting ring for attachably mounting the piercing tenderizing plate to the universal handle, and wherein said hydraulics comprise an outer hydraulic cylindrical sleeve containing a fluid or gas, sealed at one end, and the other end having an aperture adapted to receive the guide rod which functions as a piston axially located within the sleeve.

10. The food processor of claim 1, wherein the blade holder having a plurality of tapered blades has at from about 40 blades to about 100 blades, and each blade has a width of from about 1 to about 4 mm.

11. The food processor of claim 1, wherein the blade holder having a plurality of tapered blades has at from about 60 blades to about 80 blades, and each blade has a width of from about 1 to about 4 mm.

12. The food processor of claim 1, wherein the blade holder having a plurality of tapered blades has about 70 blades, and each blade has a width of from about 1 to about 4 mm.

13. The food processor of claim 1, wherein the plurality of tapered blades have a linear orientation within the blade holder wherein the linear orientation has from about three parallel rows of blades to about 8 parallel rows of blades.

14. The food processor of claim 1, wherein the plurality of tapered blades have a linear orientation within the blade holder wherein the linear orientation has about six parallel rows of blades, said plurality of blades being about 70 blades in number.

15. The food processor of claim 1, wherein the plurality of tapered blades have a spiral orientation within the blade holder wherein the spiral orientation has from about three curved rows of blades to about 8 curved rows of blades.

16. The food processor of claim 1, wherein the plurality of tapered blades have a spiral orientation within the blade holder wherein the spiral orientation has about seven curved rows of blades, said plurality of blades being about 70 blades in number.

* * * * *